US011011366B2

(12) United States Patent
Chuang et al.

(10) Patent No.: US 11,011,366 B2
(45) Date of Patent: May 18, 2021

(54) BROADBAND ULTRAVIOLET ILLUMINATION SOURCES

(71) Applicant: KLA Corporation, Milpitas, CA (US)

(72) Inventors: Yung-Ho Alex Chuang, Cupertino, CA (US); Yinying Xiao-Li, San Jose, CA (US); Edgardo Garcia-Berrios, San Jose, CA (US); John Fielden, Los Altos, CA (US)

(73) Assignee: KLA Corporation, Milpitas, CA (US)

(*) Notice: Subject to any disclaimer, the term of this patent is extended or adjusted under 35 U.S.C. 154(b) by 0 days.

(21) Appl. No.: 16/879,310

(22) Filed: May 20, 2020

(65) Prior Publication Data

US 2020/0388481 A1 Dec. 10, 2020

Related U.S. Application Data

(60) Provisional application No. 62/858,178, filed on Jun. 6, 2019.

(51) Int. Cl.
*H01J 61/067* (2006.01)
*G01N 21/88* (2006.01)
(Continued)

(52) U.S. Cl.
CPC ...... *H01J 61/0675* (2013.01); *G01N 21/8806* (2013.01); *H01J 61/106* (2013.01); *G01N 21/9501* (2013.01)

(58) Field of Classification Search
CPC H01J 61/0675; H01J 61/106; G01N 21/8806; G01N 21/9501
See application file for complete search history.

(56) References Cited

U.S. PATENT DOCUMENTS 5,608,526 A 3/1997 Piwonka-corle et al.
5,999,310 A 12/1999 Shafer et al.
(Continued)

FOREIGN PATENT DOCUMENTS

KR 1020160071231 A 6/2016

OTHER PUBLICATIONS

International Search Report and Written Opinion for Int. Application No. PCT/US2020/035797 dated Sep. 16, 2020.
(Continued)

*Primary Examiner* — Donald L Raleigh
(74) *Attorney, Agent, or Firm* — Suiter Swantz pc llo

(57) ABSTRACT

A broadband ultraviolet illumination source for a characterization system is disclosed. The broadband ultraviolet illumination source includes an enclosure having one or more walls, the enclosure configured to contain a gas, and a plasma discharge device based on a graphene-dielectric-semiconductor (GOS) planar-type structure. The GOS structure includes a silicon substrate having a top surface, a dielectric layer disposed on the top surface of the silicon substrate, and at least one layer of graphene disposed on a top surface of the dielectric layer. A metal contact may be formed on the top surface of the graphene layer. The GOS structure has several advantages for use in an illumination source, such as low operating voltage (below 50 V), planar surface electron emission, and compatibility with standard semiconductor processes. The broadband ultraviolet illumination source further includes electrodes placed inside the enclosure or magnets placed outside the enclosure to increase the current density.

24 Claims, 5 Drawing Sheets

(51) Int. Cl.
*H01J 61/10* (2006.01)
*G01N 21/95* (2006.01)

(56) References Cited

U.S. PATENT DOCUMENTS

| | | |
|---|---|---|
| 6,297,880 B1 | 10/2001 | Rosencwaig et al. |
| 7,474,461 B2 | 1/2009 | Chuang et al. |
| 7,525,649 B1 | 4/2009 | Leong et al. |
| 7,705,331 B1 | 4/2010 | Kirk et al. |
| 7,817,260 B2 | 10/2010 | Chuang et al. |
| 7,957,066 B2 | 6/2011 | Armstrong et al. |
| 9,080,971 B2 | 7/2015 | Kandel et al. |
| 9,228,943 B2 | 1/2016 | Wang et al. |
| 9,255,887 B2 | 2/2016 | Brunner |
| 9,279,774 B2 | 3/2016 | Romanovsky et al. |
| 9,470,639 B1 | 10/2016 | Zhuang et al. |
| 9,645,287 B2 | 5/2017 | Brunner |
| 9,709,510 B2 | 7/2017 | Kolchin et al. |
| 9,726,617 B2 | 8/2017 | Kolchin et al. |
| 9,891,177 B2 | 2/2018 | Vazhaeparambil et al. |
| 2010/0164347 A1 | 7/2010 | Yasuda et al. |
| 2014/0038224 A1 | 2/2014 | Yu et al. |
| 2014/0233599 A1 | 8/2014 | Park et al. |

OTHER PUBLICATIONS

Murakami, Katsuhisa et al., "Graphene-oxide-semiconductor planar-type electron emission device", Appl. Phys. Lett. 108, 083506, (2016), Submitted Oct. 10, 2015 and Published on Feb. 26, 2016, 5 pages.

Murakami, Katsuhisa et al., "Highly Monochromatic Electron Emission from Graphene/Hexagonal Boron Nitride/Si Heterostructure", ACS Appl. Mater. Interfaces, 2020, 12, 4061-4067.

Murakami, Katsuhisa et al., "High-performance planar-type electron source based on a graphene-oxide-semiconductor structure", Appl. Phys. Lett. 114, 513201, (2019), Submitted Feb. 4, 2019 and Published on May 30, 2019, 6 pages.

Murakami, Katsuhisa et al., Supporting Information for "Highly Monochromatic Electron Emission from Graphene-Hexagonal Boron Nitride-Si Heterostructure", ACS Appl. Mater. Interfaces, 2020, 12, (Supporting Information for Document #2 listed herein) 5 pages.

BROADBAND ULTRAVIOLET ILLUMINATION SOURCES

CROSS-REFERENCE

The present application claims priority to U.S. Provisional Patent Application No. 62/858,178, filed Jun. 6, 2019, entitled BROADBAND ULTRAVIOLET LIGHT SOURCE, naming Yung-Ho Alex Chuang, Yinying Xiao-Li, Edgardo Garcia-Berrios, and John Fielden as inventors, which is incorporated herein by reference in the entirety.

TECHNICAL FIELD

The present disclosure relates generally to characterization systems, and more particularly, to broadband ultraviolet (UV) illumination sources for use in characterization systems.

BACKGROUND

The integrated circuit (IC) industry requires inspection tools with increasingly higher sensitivity to detect ever smaller defects and particles whose sizes may be a few tens of nanometers (nm), or less. These inspection tools must operate at high speed in order to inspect a large fraction, or even 100%, of the area of a sample, in a short period of time. For example, inspection time may be approximately one hour for inspection during production or, at most, a few hours for research and development or troubleshooting. In order to inspect quickly, inspection tools use pixel or spot sizes larger than the dimensions of the defect or particle of interest, and detect just a small change in signal caused by a defect or particle. Detecting a small change in signal requires a high light level and a low noise level. High speed inspection is most commonly performed in production using inspection tools operating with UV light. Inspection in research and development may be performed with UV light or with electrons.

The IC industry also requires high precision metrology tools for accurately measuring the dimensions of small features down to a few nanometers or less on samples. Metrology processes are performed on samples at various points in a semiconductor manufacturing process to measure a variety of characteristics of the samples such as a width of a patterned structure on the sample, a thickness of a film formed on the sample, and overlay of patterned structures on one layer of the sample with respect to patterned structures on another layer of the sample. These measurements are used to facilitate process controls and/or yield efficiencies in the manufacturing of semiconductor dies. Metrology may be performed with UV light or with electrons.

The semiconductor industry, which is aimed at producing integrated circuits with higher integration, lower power consumption and lower costs, is one of the main drivers of UV optics. The development of powerful UV light sources such as the excimer lasers and frequency-multiplied solid-state lasers has led to the growth of research and development efforts in the field of UV photon applications. However, conventional UV light sources have a limited amount of emission in the deep UV range. Further, with conventional UV light sources discharge rapidly degrades, which limits the lifetime of the UV light source.

Therefore, it would be desirable to provide a system and method that cures the shortfalls of the previous approaches identified above.

SUMMARY

A characterization system is disclosed, in accordance with one or more embodiments of the present disclosure. In one embodiment, the system includes a stage assembly configured to support a sample. In another embodiment, the system includes a broadband ultraviolet illumination source. In another embodiment, the broadband ultraviolet illumination source includes an enclosure having one or more walls, the enclosure configured to contain a gas. In another embodiment, the broadband ultraviolet illumination source includes a plasma discharge device. In another embodiment, the plasma discharge device includes an anode. In another embodiment, the plasma discharge device includes a cathode. In another embodiment, the cathode includes a silicon substrate including a top surface. In another embodiment, the cathode includes a dielectric layer disposed on the top surface of the silicon substrate. In another embodiment, the cathode includes at least one layer of graphene formed on a top surface of the dielectric layer. In another embodiment, the cathode includes a metal contact formed on a top surface of the graphene layer. In another embodiment, the cathode includes a second power supply source configured to apply a voltage between the metal contact and the silicon substrate. In another embodiment, the plasma discharge device includes a first power supply source configured to apply a voltage between the anode and the cathode. In another embodiment, the system includes one or more optical elements configured to direct illumination from the broadband ultraviolet illumination source to the sample. In another embodiment, the one or more optical elements are configured to direct illumination reflected from the sample to a sensor.

A broadband illumination source is disclosed, in accordance with one or more embodiments of the present disclosure. In one embodiment, the illumination source includes an enclosure having one or more walls, the enclosure configured to contain a gas. In another embodiment, the illumination source includes a plasma discharge device. In another embodiment, the plasma discharge device includes an anode. In another embodiment, the plasma discharge device includes a cathode. In another embodiment, the plasma discharge device includes at least one of a focus electrode and magnet configured to focus electrons emitted by the cathode to increase the plasma density. In another embodiment, the cathode includes a silicon substrate including a top surface. In another embodiment, the cathode includes a dielectric layer disposed on the top surface of the silicon substrate. In another embodiment, the cathode includes at least one layer of graphene formed on a top surface of the dielectric layer. In another embodiment, the cathode includes a metal contact formed on a top surface of the graphene layer. In another embodiment, the cathode includes a second power supply source configured to apply a voltage between the metal contact and the silicon substrate. In another embodiment, the plasma discharge device includes a first power supply source configured to apply a voltage between the anode and the cathode.

A method for exposing a substrate to broadband ultraviolet radiation is disclosed, in accordance with one or more embodiments of the present disclosure. In one embodiment, the method includes: supplying a gas to an enclosure of a broadband illumination source; generating a plasma inside the enclosure using a plasma discharge device; generating broadband ultraviolet radiation in the enclosure; and optically coupling the broadband ultraviolet radiation to a substrate located outside the enclosure. In another embodiment, the plasma discharge device includes an anode. In another embodiment, the plasma discharge device includes a cathode. In another embodiment, the cathode includes a silicon substrate including a top surface. In another embodiment, the cathode includes a dielectric layer disposed on the top surface of the silicon substrate. In another embodiment, the cathode includes at least one layer of graphene formed on a top surface of the dielectric layer. In another embodiment, the cathode includes a metal contact formed on a top surface of the graphene layer. In another embodiment, the cathode includes a second power supply source configured to apply a voltage between the metal contact and the silicon substrate. In another embodiment, the plasma discharge device includes a first power supply source configured to apply a voltage between the anode and the cathode.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
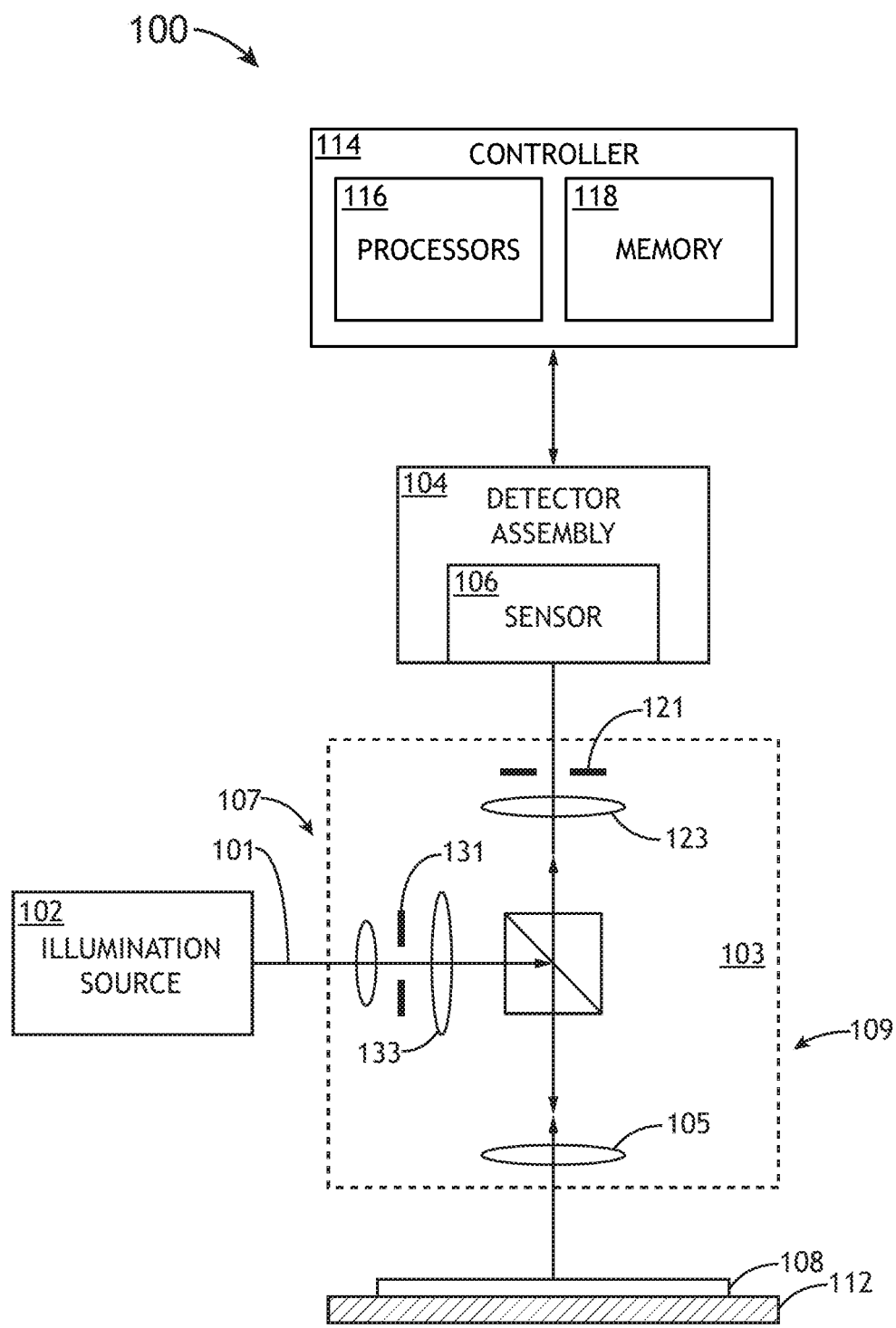
FIG. 1 illustrates a simplified schematic view of a characterization system, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Broadband ultraviolet illumination sources are used for various applications in the semiconductor processing industry. It is desirable for the illumination source to have a long useful lifetime, high brightness, and a broad spectral range of emitted illumination. Currently, plasma-based illumination sources are used in semiconductor characterization systems. Plasma-based illumination sources generally include an enclosure containing a cathode, an anode, and a discharge gas (e.g., argon, xenon, deuterium, mercury vapor, or a combination of such). A voltage between the cathode and anode maintains a plasma or electric arc.

The most common commercially available vacuum ultraviolet (VUV) illumination source is a low-pressure deuterium discharge lamp, which uses a tungsten filament and anode placed on opposite sides to produce the output spectrum. Unlike an incandescent bulb, the tungsten filament is not the source of illumination in deuterium lamps. Instead, a discharge is created from the filament to the anode. Deuterium lamps exhibit a relatively high radiant output at wavelengths from about 120 nm to about 160 nm but a relatively low radiant output at wavelengths greater than about 170 nm. Since for many applications it is desirable to use broadband radiation that spans vacuum ultraviolet, ultraviolet, visible and near infrared ranges, for those applications it is currently necessary to combine the output of a deuterium lamp with the output from another lamp, such as a xenon arc lamp or quartz-halogen lamp to cover the whole wavelength range.

Conventional plasma illumination sources suffer from a number of drawbacks when used in semiconductor characterization systems. The first drawback is that plasma illumination sources based on mercury, argon, xenon, or a combination of such have a limited amount of emission in the deep UV range. It would be desirable to increase the amount of emission at vacuum wavelengths below approximately 200 nm. Even though commercially available deuterium discharge lamps can emit at VUV wavelengths, there is still a drawback that is particularly relevant to semiconductor characterization systems. For example, the discharge tends to rapidly degrade. As the source ages, the cathode tends to erode and/or become contaminated and the arc tends to spread. Tungsten coming from the filaments in the deuterium lamps can contaminate the lamp enclosure and the output window. This limits the lifetime of the deuterium discharge lamps. The typical lifetime of a deuterium lamp is approximately 2000 hours. In addition, deuterium discharge lamps operate at high voltages. The firing voltages are about 300 to 500 volts. Once the discharge starts, the voltage drops to around 100 to 200 volts.

Embodiments of the present disclosure are directed to a broadband UV illumination source for use in semiconductor characterization systems. More particularly, embodiments of the present disclosure are directed to a broadband UV illumination source including, but not limited to, a graphene electron emitter as an electron discharge source, an anode, and an enclosure having one or more transparent walls. In this embodiment, the enclosure contains a gas, wherein the gas contained within the enclosure may include, but is not limited to, at least one of hydrogen, deuterium, or a noble gas. Specifically, the electron discharge source includes a graphene-dielectric-semiconductor (also referred to as a graphene-oxide-semiconductor (GOS)) type structure. The GOS structure includes a silicon substrate having a top surface; a dielectric layer disposed on the top surface of the silicon substrate, and at least one layer of graphene disposed on the top surface of the dielectric layer. Metal contacts may be formed on top of the graphene.

It is noted herein that for purposes of the present disclosure, the terms "graphene-oxide-semiconductor," "GOS," "graphene-dielectric-semiconductor," and variants thereof may be used interchangeably throughout and may be considered equivalent for purposes of the present disclosure, unless noted otherwise herein. GOS structures are generally discussed in K. Murakami, S. Tanaka, A. Miyashita, M. Nagao, Y. Nemoto, M. Takeguchi, and J. Fujita, "Graphene-oxide-semiconductor planar-type electron emission device,"

Appl. Phys. Lett. 108, 083506 (2016); and K. Murakami, T. Igari, K. Mitsuishi, M. Nagao, M. Sasaki, and Y. Yamada, "Highly Monochromatic Electron Emission from Graphene/Hexagonal Boron Nitride/Si Heterostructure," ACS Appl. Materials & Interfaces 12, 4061-4067 (2020), which are each herein incorporated by reference in the entirety.

This GOS structure has several advantages such as low operating voltage (below 50 V), planar surface electron emission, and compatibility with standard semiconductor processes. Graphene is a single layer of carbon atoms arranged in a hexagonal lattice exhibiting high electrical conductivity. In addition, the electron scattering cross section of carbon atoms is smaller than that of conventional metal electrodes such as gold and aluminum. Therefore, the use of graphene as the topmost gate electrode may allow electron emission efficiency to reach 20% to 30% if the graphene layer is grown with low-pressure chemical vapor deposition (LPCVD). See, for example, K. Murakami, J. Miyaji, R. Furuya, M. Adachi, M. Nagao, Y. Neo, Y. Takao, Y. Yamada, M. Sasaki, H. Mimura, "High-performance planar-type electron source based on a graphene-oxide-semiconductor structure," Appl. Phys. Lett. 114, 213501 (2019), which is herein incorporated by reference in the entirety. The electron emission efficiency may be further improved if only a few layers of graphene (ideally a single graphene layer) are used in the GOS structure. Owing to low temperature operation, unlike tungsten filaments, little graphene may be evaporated or sputtered and so may not contaminate the broadband UV source. The energy spread of the GOS structure may be less than about 1.5 eV.

An additional embodiment of the present disclosure is directed to a broadband illumination source including a plasma discharge device configured to maintain a plasma discharge in a gas contained with an enclosure of the broadband illumination source. The plasma discharge device includes electrodes inside the enclosure, and one or more magnets placed outside the enclosure to increase the current density as in an electron focusing system. Electron trajectories will tend to follow spiral paths spiraling around magnetic field lines. The one or more magnets (e.g., permanent magnets or electromagnets) placed outside the enclosure provide a magnetic field to confine the plasma discharge into a small volume within the enclosure. The one or more magnets are configured to increase the magnetic field strength near the anode relative to the magnetic field strength at the electron discharge source, so as to reduce the width of the discharge plasma and increase the plasma density close to the anode.

Another embodiment of the present disclosure is directed to a characterization system. More particularly, embodiments of the present disclosure are directed to a characterization system including a broadband ultraviolet discharge lamp using a GOS structure as the electron discharge source, an anode, and an enclosure having one or more transparent walls. The broadband illumination source may further include a plasma discharge device configured to maintain a plasma discharge of the gas within the enclosure. Additionally, the broadband illumination source may include one or more magnets configured to increase the plasma density close to the anode. Further, a substrate support may be located outside the discharge lamp. The broadband illumination source may further include one or more optic elements configured to be adapted to couple radiation from the discharge lamp to a substrate located on the substrate support.

Another embodiment of the present disclosure is directed to a method for exposing a substrate to broadband ultraviolet radiation. A gas containing at least one of hydrogen, deuterium and a noble gas is supplied to an enclosure, and a plasma is generated inside the enclosure with the gas using a GOS structure and an anode. The method may further include increasing the plasma density close to the anode by placing magnets outside the enclosure. Radiation generated as a result of the plasma discharge may be optically coupled to a substrate located outside the enclosure.

FIG. 1 illustrates a simplified schematic view of a characterization system 100, in accordance with one or more embodiments of the present disclosure. For example, the characterization tool 100 may include, but is not limited to, an inspection sub-system or a metrology sub-system configured to inspect or measure a sample 108. Sample 108 may include any sample known in the art such as, but not limited to, a wafer, reticle, photomask, or the like.

The characterization system 100 may include any characterization system known in the art including, but not limited to, an optical-based inspection tool, a review tool, an image-based metrology tool, and the like.

In one embodiment, the sample 108 is disposed on a stage assembly 112 to facilitate movement of the sample 108. The stage assembly 112 may include any stage assembly known in the art including, but not limited to, an X-Y stage, an R-θ stage, and the like. In another embodiment, the stage assembly 112 is capable of adjusting the height of the sample 108 during inspection to maintain focus on the sample 108.

In another embodiment, the characterization system 100 includes an illumination source 102 configured to generate an illumination beam 101. The illumination source 102 may include any illumination source known in the art suitable for generating an illumination beam 101. For example, the illumination source 102 may emit near infrared (NIR) radiation, visible radiation, ultraviolet (UV) radiation, near UV (NUV), deep UV (DUV) radiation, vacuum UV (VUV) radiation, and the like. For instance, the illumination source 102 may include one or more lasers. In another instance, the illumination source 102 may include a broadband illumination source.

In another embodiment, the characterization system 100 includes an illumination arm 107 configured to direct illumination from the illumination source 102 to the sample 108. The illumination arm 107 may include any number and type of optical components known in the art. In one embodiment, the illumination arm 107 includes one or more optical elements 103. In this regard, illumination arm 107 may be configured to focus illumination from the illumination source 102 onto the surface of the sample 108. It is noted herein that the one or more optical elements 103 may include any optical element know in the art including, but not limited to, an objective lens 105, one or mirrors, one or more lenses, one or more polarizers, one or more beam splitters, or the like.

In another embodiment, a collection arm 109 is configured to collect illumination reflected, scattered, diffracted, and/or emitted from the sample 108. In another embodiment, the collection arm 109 may direct and/or focus the illumination from the sample 108 to a sensor 106 of a detector assembly 104. It is noted herein that the sensor 106 and the detector assembly 104 may include any sensor 106 and detector assembly 104 known in the art. The sensor may include, but is not limited to, a charge-coupled device (CCD detector), a complementary metal oxide semiconductor (CMOS) detector, a time-delay integration (TDI) detector, a photomultiplier tube (PMT), an avalanche photodiode (APD), a line sensor, an electron-bombarded line sensor, or the like.

In another embodiment, the detector assembly 104 is communicatively coupled to a controller 114 including one or more processors 116 and memory 118. For example, the one or more processors 116 may be communicatively coupled to memory 118, wherein the one or more processors are configured to execute a set of program instructions stored on memory 118. In one embodiment, the controller 114 controls the characterization system 100 and/or the sensor 106 to characterize (e.g., inspect or measure) a structure on sample 108.

In one embodiment, illumination source 102 includes a broadband UV illumination source including a graphene-dielectric-semiconductor (GOS) structure. The broadband UV illumination source may include, but is not limited to, an electron discharge source, an anode, an enclosure having one or more transparent walls, and the like. The enclosure may include a gas. For example, the gas contained within the enclosure may include, but is not limited to, hydrogen, deuterium, and/or a noble gas such as, but not limited to, helium, neon, argon, krypton, or xenon.

In one embodiment, the broadband ultraviolet source includes a plasma discharge device configured to maintain a plasma discharge of the gas within the enclosure. The illumination beam 101 of the illumination source 102 may include wavelengths in an ultraviolet region, such as in a DUV (~200 nm to 280 nm) or a VUV (~100 nm to 200 nm) spectral range. The electron discharge source of the broadband UV illumination source may be based on a GOS-type structure.

In another embodiment, the GOS structure includes a graphene-dielectric-semiconductor planar-type electron emission device. For example, the GOS structure includes, but is not limited to, a silicon substrate having a top surface, a dielectric layer disposed on the top surface of the silicon substrate, and at least one layer of graphene disposed on a top surface of the dielectric layer. The dielectric layer may include any dielectric known in the art. For example, the dielectric layer may include boron nitride or silicon dioxide. In another embodiment, metal contacts may be formed on a top surface of the graphene layer.

In another embodiment, the illumination source 102 includes a broadband UV illumination source including a GOS structure as the electron discharge source. In another embodiment, the broadband UV illumination source includes an enclosure having one or more transparent walls. The enclosure may include a gas within the enclosure. For example, the gas contained within the enclosure may include, but is not limited to, at least one of hydrogen, deuterium, or a noble gas.

In another embodiment, a plasma discharge device is configured to maintain a plasma discharge of the gas within the enclosure. The output spectrum (e.g., illumination beam 101) of the illumination source 102 may include, but is not required to include, wavelengths in the ultraviolet region, such as in a DUV (~200 nm to 280 nm) or a VUV (~100 nm to 200 nm) spectral range.

In another embodiment, the plasma discharge device includes one or more electrodes within the enclosure. In another embodiment, the plasma discharge device may include one or more magnets placed outside the enclosure. The one or more magnets and/or the one or more electrodes may be configured to increase the current density as in an electron focusing system. It is noted herein that electron trajectories tend to follow spiral paths spiraling around magnetic field lines. The one or more magnets (e.g., permanent magnets or electromagnets) may provide a magnetic field that confines the plasma discharge to a small volume within the enclosure. In an example embodiment where an electromagnet is used, a power supply may be configured to apply a DC voltage to the electromagnet to create a static magnetic field. The one or more magnets may be configured to increase the magnetic field strength near the anode relative to the magnetic field strength at the electron discharge source, so as to reduce the width of the discharge plasma and increase the plasma density close to the anode.

In one embodiment, the characterization system 100 illuminates a line on sample 108 and collects scattered and/or reflected illumination in one or more dark-field and/or bright-field collection channels. In this embodiment, detector assembly 104 may include a line sensor or an electron-bombarded line sensor.

In one embodiment, the one or more optical elements 103 includes an illumination tube lens 133. The illumination tube lens 133 may be configured to image an illumination pupil aperture 131 to a pupil within the objective lens 105. For example, the illumination tube lens 133 may be configured such that the illumination pupil aperture 131 and the pupil are conjugate to one another. In one embodiment, the illumination pupil aperture 131 may be configurable by switching different apertures into the location of illumination pupil aperture 131. In another embodiment, the illumination pupil aperture 131 may be configurable by adjusting a diameter or shape of the opening of the illumination pupil aperture 131. In this regard, the sample 108 may be illuminated by different ranges of angles depending on the characterization (e.g., measurement or inspection) being performed under control of the controller 114.

In one embodiment, the one or more optical elements 103 include a collection tube lens 123. For example, the collection tube lens 123 may be configured to image the pupil within the objective lens 105 to a collection pupil aperture 121. For instance, the collection tube lens 123 may be configured such that the collection pupil aperture 121 and the pupil within the objective lens 105 are conjugate to one another. In one embodiment, the collection pupil aperture 121 may be configurable by switching different apertures into the location of collection pupil aperture 121. In another embodiment, the collection pupil aperture 121 may be configurable by adjusting a diameter or shape of the opening of collection pupil aperture 121. In this regard, different ranges of angles of illumination reflected or scattered from the sample 108 may be directed to detector assembly 104 under control of the controller 114.

In another embodiment, at least one of illumination pupil aperture 131 and collection pupil aperture 121 may include a programmable aperture. Programmable apertures are generally discussed in U.S. Pat. No. 9,255,887, entitled "2D programmable aperture mechanism," to Brunner, issued on Feb. 9, 2016; U.S. Pat. No. 9,645,287, entitled "Flexible optical aperture mechanisms," to Brunner, issued on May 9, 2017, both of which are herein incorporated by reference in the entirety. Methods of selecting an aperture configuration for inspection is generally described in U.S. Pat. No. 9,709,510, entitled "Determining a configuration for an optical element positioned in a collection aperture during wafer inspection," to Kolchin et al., issued on Jul. 18, 2017; and U.S. Pat. No. 9,726,617, entitled "Apparatus and methods for finding a best aperture and mode to enhance defect detection," to Kolchin et al, issued on Aug. 8, 2017, both of which are herein incorporated by reference in the entirety.

Characterization systems are generally described in U.S. Pat. No. 9,891,177, entitled "TDI Sensor in a Darkfield System", to Vazhaeparambil et al., issued on Feb. 13, 2018; U.S. Pat. No. 9,279,774, entitled "Wafer Inspection", to Romanovsky et al., issued on Mar. 8, 2018; U.S. Pat. No. 7,957,066, entitled "Split Field Inspection System Using Small Catadioptric Objectives," to Armstrong et al., issued on Jun. 7, 2011; U.S. Pat. No. 7,817,260, entitled "Beam Delivery System for Laser Dark-Field Illumination in a Catadioptric Optical System," to Chuang et al., issued on Oct. 19, 2010; U.S. Pat. No. 5,999,310, entitled "Ultra-Broadband UV Microscope Imaging System with Wide Range Zoom Capability," to Shafer et al., issued on Dec. 7, 1999; U.S. Pat. No. 7,525,649, entitled "Surface Inspection System Using Laser Line Illumination with Two Dimensional Imaging," to Leong et al., issued on Apr. 28, 2009; U.S. Pat. No. 9,080,971, entitled "Metrology Systems and Methods," to Kandel et al., issued on Jul. 14, 2015; U.S. Pat. No. 7,474,461, entitled "Broad Band Objective Having Improved Lateral Color Performance," to Chuang et al., issued on Jan. 6, 2009; U.S. Pat. No. 9,470,639, entitled "Optical Metrology With Reduced Sensitivity To Grating Anomalies," to Zhuang et al., issued on Oct. 18, 2016; U.S. Pat. No. 9,228,943, entitled "Dynamically Adjustable Semiconductor Metrology System," to Wang et al., issued on Jan. 5, 2016; U.S. Pat. No. 5,608,526, entitled "Focused Beam Spectroscopic Ellipsometry Method and System," to Piwonka-Corle et al., issued on Mar. 4, 1997; and U.S. Pat. No. 6,297,880, entitled "Apparatus for Analyzing Multi-Layer Thin Film Stacks on Semiconductors," to Rosencwaig et al., issued on Oct. 2, 2001, all of which are incorporated herein by reference in the entirety.

It is noted herein that the one or more components of system 100 may be communicatively coupled to the various other components of system 100 in any manner known in the art. For example, the one or more processors 116 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like).

The one or more processors 116 may include any one or more processing elements known in the art. In this sense, the one or more processors 116 may include any microprocessor-type device configured to execute software algorithms and/or instructions. The one or more processors 116 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 116. In general, the term "processor" may be broadly defined to encompass any device having one or more processing elements, which execute program instructions from memory 118. Moreover, different subsystems of the system 100 (e.g., illumination source 102, detector assembly 104, controller 114, and the like) may include processor or logic elements suitable for carrying out at least a portion of the steps described throughout the present disclosure. Therefore, the above description should not be interpreted as a limitation on the present disclosure but merely an illustration.

The memory 118 may include any storage medium known in the art suitable for storing program instructions executable by the associated one or more processors 116 and the data received from the metrology sub-system and/or inspection sub-system. For example, the memory 118 may include a non-transitory memory medium. For instance, the memory 118 may include, but is not limited to, a read-only memory (ROM), a random-access memory (RAM), a magnetic or optical memory device (e.g., disk), a magnetic tape, a solid-state drive and the like. It is further noted that memory 118 may be housed in a common controller housing with the one or more processors 116. In an alternative embodiment, the memory 118 may be located remotely with respect to the physical location of the processors 116, controller 114, and the like. In another embodiment, the memory 118 maintains program instructions for causing the one or more processors 116 to carry out the various steps described through the present disclosure.

Figure 2A:
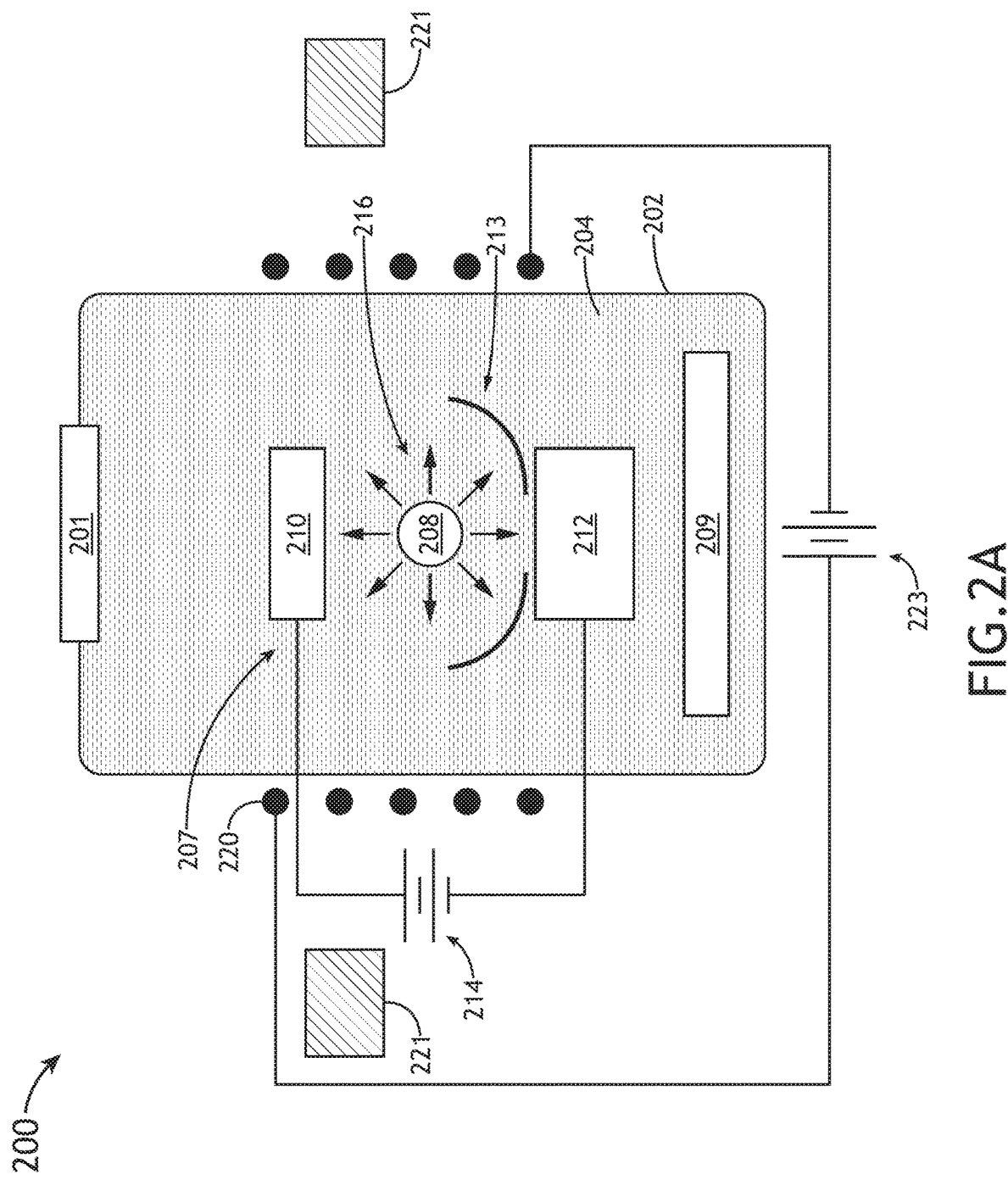
FIG. 2A illustrates a schematic diagram of a broadband ultraviolet illumination source, in accordance with one or more embodiments of the present disclosure.

FIG. 2A illustrates a schematic diagram of a broadband ultraviolet illumination source 200, in accordance with one or more embodiments of the present invention. It is noted herein that the description of various embodiments, components, and operations described previously with respect to the characterization system 100 should be interpreted to extend to the broadband illumination source 200 unless otherwise noted herein.

In one embodiment, the broadband illumination source 200 includes an enclosure 202 having one or more walls. In another embodiment, the one or more walls of the enclosure 202 are at least partly transparent. In this regard, the one or more walls of the enclosure 202 may include a material that is transparent or partly transparent at wavelengths of interest. For example, the broadband UV illumination source 200 may include, but is not limited to, a transparent window 201 incorporated into a wall of the enclosure 202. For instance, at least one of the one or more walls of the enclosure 202 may be at least partly transparent at a wavelength between 130 nm and 400 nm. The window 201 may be formed of any material known in the art including, but not limited to, quartz, fused silica, magnesium fluoride ($MgF_2$), calcium fluoride ($CaF_2$), strontium tetraborate ($SrB_4O_7$), or the like.

In one embodiment, a gas 204 is contained within the enclosure 202. For purposes of the present disclosure, the term "enclosure" refers to a closed environment having one or more walls that contain the gas 204, while preventing the ambient atmosphere from undesirably contaminating the gas 204. The gas 204 may include, but is not limited to, one or more of hydrogen, deuterium, or a noble gas. The noble gas may include, but is not limited to, at least one of helium, neon, argon, krypton, xenon, or the like. In one embodiment, the enclosure 202 may be filled with gas 204 and then sealed. In another embodiment, an external gas source (not shown) may supply gas 204 as needed to the enclosure 202.

In one embodiment, the broadband ultraviolet illumination source 200 is configured to operate as a low-pressure discharge lamp. For example, the broadband ultraviolet illumination source 200 may operate as a low-pressure discharge lamp with a fill pressure of the gas 204 between approximately 1 Pa and 10000 Pa. In another embodiment, the broadband ultraviolet illumination source 200 is configured to operate as a high-pressure discharge lamp. For example, the broadband ultraviolet illumination source 200 may operate as a high-pressure discharge lamp with a fill pressure of gas 204 between approximately $10^4$ and $10^6$ Pa (e.g., between approximately 0.1 and 10 atmospheres). It is noted herein that the operating pressure of the illumination source 200 may be higher than the fill pressure depending on the operating temperature of the illumination source 200.

In one embodiment, the enclosure 202 includes a getter 209. For example, the getter 209 may be placed within the enclosure 202 to remove impurities during operation of the illumination source 200. It is noted herein that the enclosure 202 may include any getter suitable for removing impurities including, but not limited to, non-evaporable getters (NEGs), hydrogen getters, evaporable getters, getter films, or the like.

In one embodiment, the broadband UV illumination source 200 includes a plasma discharge device 207 configured to be adapted to maintain a plasma discharge 208 of the gas 204. For example, the plasma discharge 208 of the gas 204 may take place within the enclosure 202. The gas pressure may be between approximately 1 Pa and 10000 Pa for a low-pressure discharge lamp. Further, the gas pressure may be between $10^4$ and $10^6$ Pa (e.g., between 0.1 and 10 atm) for a high-pressure discharge lamp. It is noted herein that the gas pressure may be any pressure suitable to obtain intense radiation of ultraviolet illumination from the discharge 208 for use in characterization systems (e.g., the characterization system 100 shown in FIG. 1). In one embodiment, as shown in FIG. 2A, the plasma discharge device 207 includes an anode 210 positioned a select distance from a cathode 212. For example, the anode 210 and cathode 212 may be disposed within the enclosure 202 a select distance apart. In one embodiment, that select distance may be approximately equal to 1 mm, such as a distance between about 500 μm and 2 mm.

In one embodiment, the plasma discharge device 207 includes a first power supply 214 configured to apply a DC voltage between the anode 210 and cathode 212. For example, the voltage may produce an electric field that maintains the discharge 208. In this regard, the discharge 208 may produce broadband radiation 216. In another embodiment, the first power supply 214 applies a voltage between the anode 210 and cathode 212 sufficient to ionize a portion of the gas 204 to ignite (or initiate) the discharge 208. For example, a high voltage (e.g., hundreds of Volts) may be applied by the first power supply 214 to ignite the discharge and a lower voltage, (e.g., between approximately 50 V and 200 V) may be applied to sustain the discharge once ignited. In an alternative embodiment, the emission current from the cathode 212 may be initially increased to initiate the discharge while maintaining a constant voltage on the anode. As explained below in relation to FIG. 3, the emission current may be controlled by the bias voltage applied to the GOS structure.

In one embodiment, the cathode 212 includes a GOS structure including a graphene-dielectric-semiconductor planar-type emission device. For example, the GOS structure may include, but is not limited to, a silicon substrate having a top surface, a dielectric layer disposed on the top surface of the silicon substrate, and at least one layer of graphene disposed on the top surface of the dielectric layer. In some embodiments, metal contacts may be formed on a top surface of the graphene layer. For purposes of the present disclosure, the term "graphene" refers to a single layer of carbon atoms arranged in a hexagonal lattice exhibiting high electrical conductivity.

It is noted herein that the GOS structure has several advantages such as low operating voltage (below 50 V), planar surface electron emission, and compatibility with standard semiconductor processes. In addition, the electron scattering cross section of carbon atoms is smaller than that of conventional metal electrodes such as gold and aluminum. Therefore, the use of graphene as the topmost gate electrode may allow electron emission efficiency to reach 20% to 30% if the graphene layer is grown with low-pressure chemical vapor deposition (LPCVD). Unlike tungsten filaments, graphene may not be a contaminant for the broadband UV lamp. The energy spread of electrons emitted from the present GOS structure may be less than approximately 1.5 eV.

In some embodiments, although not shown in FIG. 2A, a second power supply may be connected to the GOS structure. The second power supply may be configured to cause electron emission. The second power supply may be discussed further herein.

It is contemplated herein that one or more internal components of the illumination source 200 (e.g., the interior walls of the enclosure 202, the anode 210, the cathode 212, and like) may be configured to be cleaned in accordance with ultra-high vacuum (UHV) standards using pre-clean and pre-bake procedures. Further, it is contemplated herein that after assembly, the one or more internal components of the illumination source 200 (e.g., the interior walls of the enclosure 202, the anode 210, the cathode 212, and like) may be configured to be flushed with ultra-high purity (e.g., to within parts-per-trillion) argon.

In some embodiments, the broadband UV illumination source 200 may include additional electrodes. For example, the broadband UV illumination source 200 may include electrode 213 to focus or direct the electrons from cathode 212 to anode 210. In one embodiment, as depicted, electrode 213 may be at the same potential as the cathode 212. In another embodiment, electrode 213 may be at a more negative potential than cathode 212. In another embodiment, one of the cathode 212 or the anode 210 may be at ground potential.

In some embodiments, the broadband UV illumination source 200 may include one or more magnets. For example, the broadband UV illumination source 200 may include one or more electromagnets 220. By way of another example, the broadband UV illumination source 200 may include one or more permanent magnets 221. In this embodiment, the one or more magnets may be configured to increase the current density as in an electron focusing system. For example, electron trajectories tend to follow spiral paths along magnetic field lines, such that the configuration of the one or more magnets may be adjusted to increase the electron density. For instance, by spacing the windings of the one or more electromagnets 220 more closely together near the anode 210 (rather than near the cathode 212), the field strength will be higher near the anode, and the electron density will be increased near the anode. In the example embodiment where the one or more electromagnets 220 are used, a third power supply 223 may be configured to apply a DC voltage to the one or more electromagnets 220 to create a static magnetic field. It is noted herein that the broadband UV illumination source 200 may include various magnet configurations suitable for the focusing of the electron current in the plasma. Therefore, the configuration shown in FIG. 2A is provided merely for illustrative purposes and should not be construed as limiting the scope of the present disclosure.

Figure 2B:
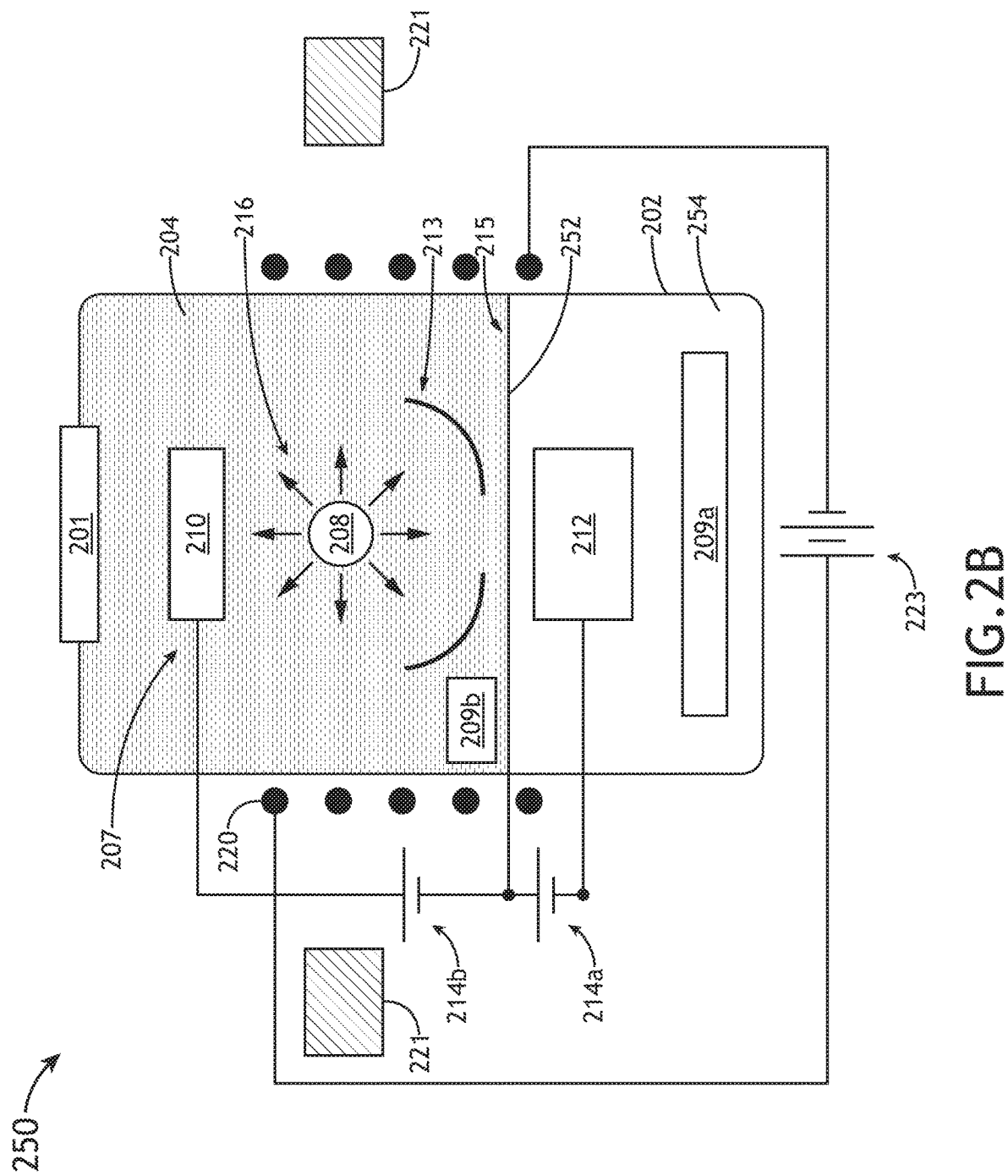
FIG. 2B illustrates a schematic diagram of a broadband ultraviolet illumination source, in accordance with one or more embodiments of the present disclosure.

FIG. 2B illustrates a schematic diagram of a broadband ultraviolet illumination source 250, in accordance with one or more alternative embodiments of the present invention. It is noted herein that the description of various embodiments, components, and operations described previously with respect to the characterization system 100 and broadband illumination source 200 should be interpreted to extend to the broadband illumination source 250 unless otherwise noted herein. As used herein, where a feature or element in FIG. 2B has the same reference label as a feature or element in FIG. 2A, it may be assumed that the feature or element in FIG. 2B has a similar function and may be similarly configured as the corresponding feature or element in FIG. 2A, unless otherwise noted herein.

In one embodiment, the enclosure 202 of ultraviolet illumination source 250 is divided into two volumes by a first anode 251. For example, an upper volume is filled with a gas 204 as described above in relation to FIG. 2A. By way of another example, a lower volume 254 contains a vacuum or a low-pressure gas, such as a gas with a pressure less than a few Pascal (Pa). The enclosure 202 and anode 251 are configured to maintain a seal between the upper and lower volumes such that the pressure in the lower volume 254 remains below a desired low pressure, such as a pressure of approximately 1 Pa, over the operating life of the ultraviolet illumination source 250 which may be approximately one year or longer. Lower volume 254 contains cathode 212 which includes a GOS structure configured to emit electrons. The emitted electrons are accelerated toward first anode 251, which is maintained at a positive potential relative to cathode 212 by power supply 214a. At least a portion of anode 251 includes a thin membrane 252, such as a membrane with a thickness of less than 10 µm, that comprises a low atomic number element such as, but not limited to, beryllium, magnesium, aluminum, or the like. In one embodiment, thin membrane 252 includes at least 50% by atomic composition low atomic number elements having atomic numbers of 13 or lower. For example, the thin membrane 252 may include at least 50% beryllium by atomic composition. Power supply 214a may maintain anode 251 at a potential of more than +10 kV relative to cathode 212. It is noted herein that electrons striking the thin membrane 252 may have an energy of 10 keV or greater (corresponding to the potential difference between the cathode and anode) such that a significant fraction of those electrons may penetrate through the thin membrane 252.

Electrons that penetrate through the thin membrane 252 into the upper volume containing gas 204 will be accelerated towards second anode 210 which is maintained at a positive potential relative to a first anode 251 by power supply 214b. Electrons travelling through gas 204 towards second anode 210 create plasma discharge 208 that emits broadband radiation 216. Power supply 214b may maintain the second anode 210 at a potential of between approximately +20 V and +200 V relative to the first anode 251. At least one of the power supply 214a or the power supply 214b may be adjusted during operation to initiate and maintain the plasma discharge and control the intensity of broadband emission 216. Alternatively, the emission current from the cathode may be adjusted to initiate and maintain the plasma discharge. One of the cathode, the first anode, or the second anode may be at ground potential.

In some embodiments, at least one of the lower and upper volumes may optionally include getters 209a and 209b, respectively.

Figure 3:
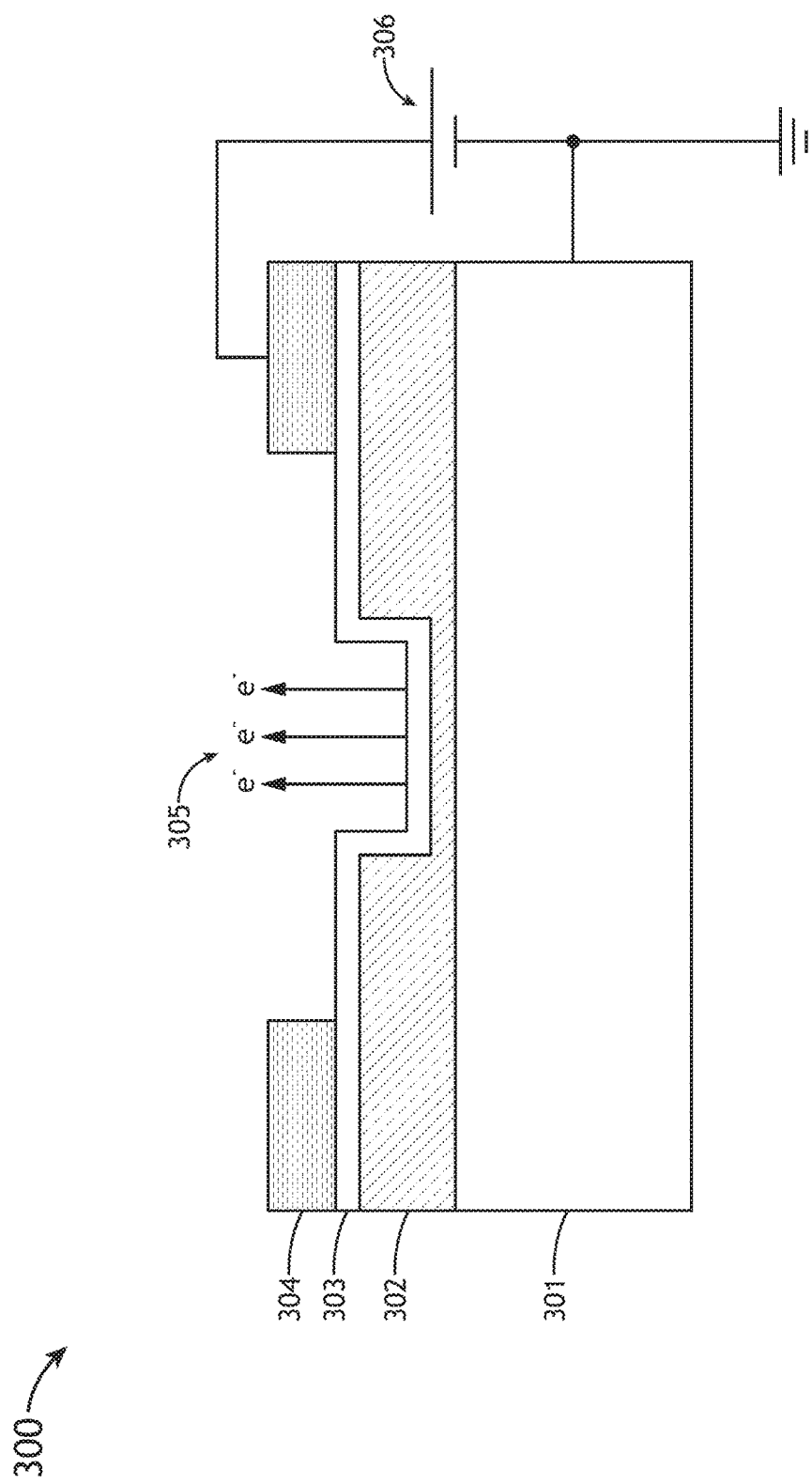
FIG. 3 illustrates a cross-sectional side view of a known graphene-dielectric-semiconductor of the broadband ultraviolet illumination source, in accordance with one or more embodiments of the present disclosure.

FIG. 3 illustrates a cross-sectional side view diagram of a known graphene-dielectric-semiconductor (GOS) structure 300 suitable for use as a cathode, in accordance with one or more embodiments of the present invention. It is noted herein that the description of various embodiments, components, and operations described previous with respect to the characterization system 100 should be interpreted to extend to the GOS structure 300 unless otherwise noted herein. Further, it is noted herein that the description of various embodiments, components, and operations described previous with respect to the broadband illumination source 200, 250 should be interpreted to extend to the GOS structure 300 unless otherwise noted herein.

In one embodiment, the GOS structure 300 includes a graphene-dielectric semiconductor planar-type electron emission device. For example, the GOS structure includes, but is not limited to, a silicon substrate 301 having a top surface, a dielectric layer 302 disposed on the top surface of the silicon substrate 301, and at least one layer of graphene 303 disposed on the top surface of the dielectric layer. In some embodiments, one or more metal contacts 304 may be formed on a top surface of the graphene layer. It is noted herein that the GOS structure 300 depicted in FIG. 3 is provided merely for illustrative purposes and should not be construed as limiting the scope of the present disclosure. The GOS structure 300 may include any combination of layers and any configuration of layers.

It is noted herein that the GOS structure 300 has several advantages such as low operating voltage (below 50 V), planar surface electron emission, and compatibility with standard semiconductor processes. As previously noted herein, the term "graphene" refers to a single layer of carbon atoms arranged in a hexagonal lattice exhibiting high electrical conductivity. In addition, the electron scattering cross section of carbon atoms is smaller than that of conventional metal electrodes such as gold and aluminum. Therefore, the use of graphene as the topmost gate electrode may allow electron emission efficiency to reach 20% to 30% if the graphene layer is grown with low-pressure chemical vapor deposition (LPCVD).

Further, it is noted herein that the electron emission efficiency can be further improved if only a few layers of graphene (preferably a single graphene layer) are used in the GOS structure 300. Owing to low temperature operation, unlike tungsten filaments, graphene may not be a contaminant for the broadband UV lamp and the rest of the optical system. The energy spread of the present GOS structure is less than about 1.5 eV.

In one embodiment, the silicon substrate may be an n-type doped with a doping level. For example, the silicon substrate may be an n-type doped with a doping level between approximately $10^{16}$ cm$^{-3}$ and about $10^{19}$ cm$^{-3}$. In another embodiment, the electron emission may be, but is not required to be, rectangular, square, circular, or the like with linear dimensions between approximately 10 µm and 1 mm. It is noted herein that electron emission 305 takes place when a bias voltage is applied across the GOS structure 300 using second power supply 306. In preferred embodiments, the bias voltage is below 50 V. For purposes of the present disclosure, the term "emission efficiency" refers to the ratio of the emitted current 305 to the current from power supply 306 through substrate 301. In a preferred embodiment, the emission efficiency increases as the bias voltage increases and may reach 20% to 30%. It is noted herein that although FIG. 3 depicts the silicon substrate as being at ground potential, the cathode need not be grounded. As described above in relation to FIGS. 2A and 2B, one of the cathode, the first anode, or the second anode may be at ground potential.

In one embodiment, the dielectric layer may be configured to be grown by thermal oxidation of silicon. In another embodiment, a dielectric material other than silicon dioxide may be used. For example, the dielectric material may be boron nitride. In another embodiment, the graphene layer(s) may be configured to be grown by low-pressure chemical vapor deposition (LPCVD). In another embodiment, the metal contact electrodes may be fabricated using conventional photolithography, radio frequency sputtering, and a lift-off process. However, it is noted herein, that one or more layers of the GOS structure 300 may be fabricated via any mechanism known in art, therefore the above discussion should not be construed as limiting the scope of the present disclosure.

Figure 4:
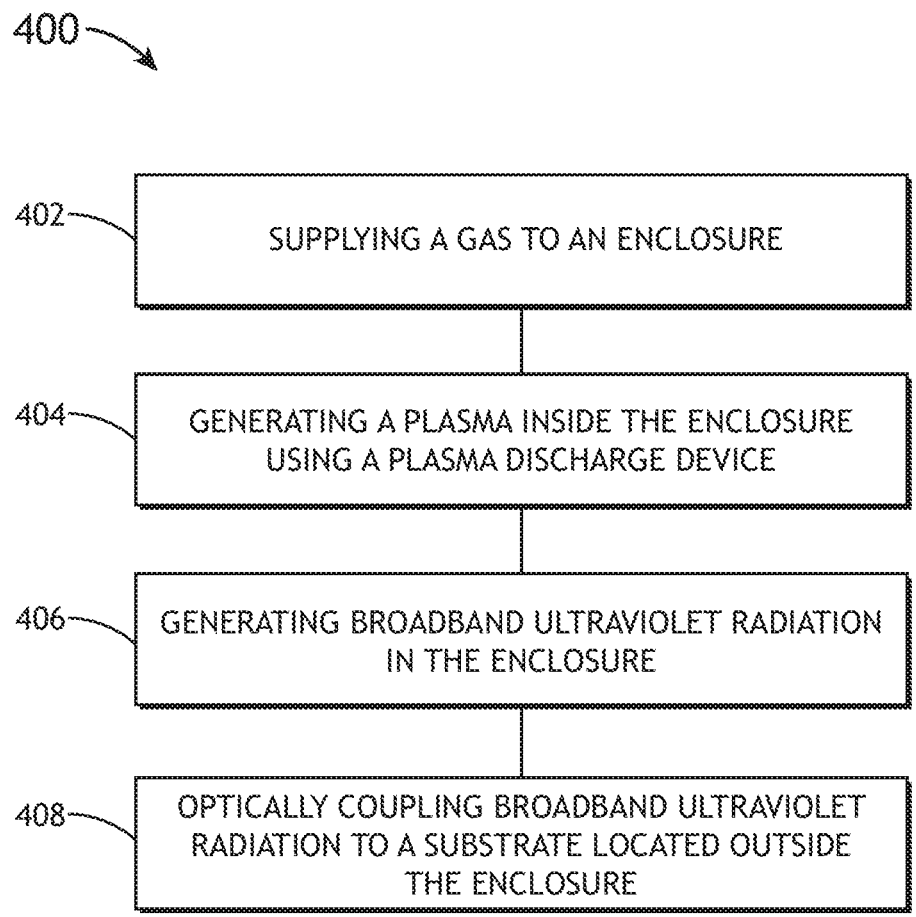
FIG. 4 is a flow diagram depicting a method for exposing a substrate to broadband ultraviolet radiation, in accordance with one or more embodiments of the present disclosure.

FIG. 4 is a flow diagram depicting a method 400 for exposing a substrate to broadband UV radiation, in accordance with one or more embodiments of the present disclosure. It is noted herein that the steps of method 400 may be implemented all or in part by system 100, 200, 250, 300. It is further recognized, however, that the method 400 is not limited to the system 100, 200, 250, 300 in that additional or alternative system-level embodiments may carry out all or part of the steps of method 400.

In step 402, a gas is supplied to an enclosure of a broadband illumination source. In one embodiment, the enclosure 202 of the broadband illumination source 200 may contain a gas 204. For example, the gas 204 of the enclosure 202 may be supplied to the enclosure via an external gas source. For instance, the external gas source may be configured to supply the gas as needed to the enclosure 202. By way of another example, the enclosure 202 may be filled with gas 204 and then sealed. The gas may include, but is not limited to, at least one of hydrogen, deuterium, or a noble gas such as, but not limited to, helium, neon, argon, krypton, or xenon.

In step 404, a plasma is generated inside the enclosure using a plasma discharge device. In one embodiment, the plasma discharge device 207 is configured to maintain a plasma discharge 208 of the gas 204 within the enclosure 202. In another embodiment, the plasma discharge device 207 includes an anode 210 positioned a select distance from a cathode 212. For example, the anode 210 and the cathode 212 may be disposed with the enclosure 202 a select distance apart.

In another embodiment, the cathode 212 includes a GOS structure including a graphene-dielectric-semiconductor planar-type electron emission device. For example, the GOS structure may include, but is not limited to, a silicon substrate having a top surface, a dielectric layer disposed on the top surface of the silicon substrate, and at least one layer of graphene disposed on the top surface of the dielectric layer. In some embodiments, one or more metal contacts may be formed on a top surface of the graphene layer.

In another embodiment, the GOS structure of the cathode and the anode of the plasma discharge device are configured to generate the plasma inside the enclosure including the gas.

In an optional step, plasma density may be increased close to the anode of the plasma discharge device. For example, the plasma density may be increased close to the anode by placing one or more magnets outside the enclosure. For instance, the one or more magnets may include at least one of a permanent magnet and an electromagnet. In an alternative embodiment, the plasma density may be increased close to the anode by placing one or more focusing electrodes inside the enclosure. In another embodiment, both focusing electrodes and magnets may be used.

In step 406, broadband ultraviolet radiation is generated. In one embodiment, a first power supply 214 applies a DC voltage between the anode 210 and cathode 212 of the plasma discharge device. For example, the voltage may produce an electric field that maintains the discharge 208. In this regard, the discharge 208 may produce broadband radiation 216. In another embodiment, the first power supply 214 applies a voltage between the anode 210 and cathode 212 sufficient to ionize a portion of the gas 204 to ignite (or initiate) the discharge 208. For example, a high voltage (e.g., hundreds of Volts) may be applied by the first power supply 214 to ignite the discharge and a lower voltage, (e.g., between approximately 50 V and 200 V) may be applied to sustain the discharge once ignited. In another embodiment, the emission current may be initially increased to initiate the discharge 208 while maintaining a constant voltage on the anode 210.

In step 408, the broadband ultraviolet radiation is optically coupled to a substrate located outside the enclosure.

It is further contemplated that each of the embodiments of the method described above may include any other step(s) of any other method(s) described herein. In addition, each of the embodiments of the method described above may be performed by any of the systems described herein.

One skilled in the art will recognize that the herein described components, operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A characterization system, comprising:
   a stage assembly, the stage assembly configured to support a sample;
   a broadband ultraviolet illumination source, the broadband ultraviolet illumination source comprising:
      an enclosure having one or more walls, the enclosure configured to contain a gas; and
      a plasma discharge device, the plasma discharge device comprising:
         an anode;
         a cathode, the cathode comprising:
            a silicon substrate, the silicon substrate having a top surface;
            a dielectric layer, the dielectric layer disposed on the top surface of the silicon substrate;
            at least one layer of graphene disposed on a top surface of the dielectric layer;
            a metal contact, the metal contact formed on a top surface of the graphene layer; and
            a second power supply source, the second power supply source configured to apply a voltage between the metal contact and the silicon substrate; and
         a first power supply source, the first power supply source configured to apply a voltage between the anode and the cathode; and
   one or more optical elements, the one or more optical elements configured to direct illumination from the broadband ultraviolet illumination source to the sample, the one or more optical elements further configured to direct illumination reflected or scattered from the sample to a sensor.

2. The system of claim 1, wherein at least one of the one or more walls of the enclosure is at least partly transparent at a wavelength within a range from 130 nm to 400 nm.

3. The system of claim 1, wherein the enclosure includes a window, wherein the window is at least partly transparent at a wavelength within a range from 130 nm to 400 nm.

4. The system of claim 1, wherein the gas includes at least one of hydrogen, deuterium, helium, neon, argon, krypton, and xenon.

5. The system of claim 4, wherein a fill pressure of the gas is between 1 Pa and 10000 Pa.

6. The system of claim 4, wherein a fill pressure of the gas is between 0.1 atmospheres and 10 atmospheres.

7. The system of claim 1, wherein the second power supply source is configured to apply a voltage between 10 V and 50 V.

8. The system of claim 1, wherein the first power supply source is configured to apply a voltage between 50 V and 200 V.

9. The system of claim 1, further comprising one or more focusing electrodes placed inside the enclosure.

10. The system of claim 1, further comprising one or more magnets placed outside the enclosure.

11. The system of claim 10, wherein the one or more magnets comprise at least one of a permanent magnet or an electromagnet.

12. The system of claim 1, further comprising:
    a detector assembly, the detector assembly including the sensor, the detector assembly communicatively coupled to a controller including one or more processors and memory.

13. A method for exposing a substrate to broadband ultraviolet radiation, comprising:
    supplying a gas to an enclosure of a broadband ultraviolet illumination source;
    generating a plasma inside the enclosure using a plasma discharge device;
    generating broadband ultraviolet radiation in the enclosure; and
    optically coupling the broadband ultraviolet radiation to a substrate located outside the enclosure, the plasma discharge device comprising:

an anode;
a cathode, the cathode comprising:
  a silicon substrate having a top surface;
  a dielectric layer disposed on the top surface of the silicon substrate;
  at least one layer of graphene disposed on a top surface of the dielectric layer;
  a metal contact formed on a top surface of the graphene layer; and
  a second power supply source, the second power supply source configured to apply a voltage between the metal contact and the silicon substrate; and
a first power supply source, the first power supply source configured to apply a voltage between the anode and the cathode.

14. The method of claim 13, wherein at least one of one or more walls of the enclosure is at least partly transparent at a wavelength within a range from 130 nm to 400 nm.

15. The method of claim 13, wherein the enclosure includes a window, wherein the window is at least partly transparent at a wavelength within a range from 130 nm to 400 nm.

16. The method of claim 13, wherein the gas includes at least one of hydrogen, deuterium, helium, neon, argon, krypton, and xenon.

17. The method of claim 16, wherein a fill pressure of the gas is between 1 Pa and 10000 Pa.

18. The method of claim 16, wherein a fill pressure of the gas is between 0.1 atmospheres and 10 atmospheres.

19. The method of claim 13, wherein the second power supply source is configured to apply a voltage between 10 V and 50 V.

20. The method of claim 13, wherein the first power supply source is configured to apply a voltage between 50 V and 200 V.

21. The method of claim 13, further comprising:
increasing a plasma density close to the anode of the plasma discharge device.

22. The method of claim 21, wherein the plasma density is increased by placing one or more focusing electrodes inside the enclosure.

23. The method of claim 21, wherein the plasma density is increased by placing one or more magnets outside the enclosure.

24. The method of claim 23, wherein the one or more magnets comprise at least one of a permanent magnet or an electromagnet.

* * * * *